United States Patent
Mack

(10) Patent No.: US 11,208,585 B2
(45) Date of Patent: Dec. 28, 2021

(54) HIGH DENSITY, LOW TCT DIVALENT BRINES AND USES THEREOF

(71) Applicant: Tetra Technologies, Inc., Conroe, TX (US)

(72) Inventor: Arthur G. Mack, Conroe, TX (US)

(73) Assignee: TETRA TECHNOLOGIES, INC., Conroe, TX (US)

(*) Notice: Subject to any disclaimer, the term of this patent is extended or adjusted under 35 U.S.C. 154(b) by 0 days.

(21) Appl. No.: 15/468,842

(22) Filed: Mar. 24, 2017

(65) Prior Publication Data

US 2018/0237679 A1 Aug. 23, 2018

Related U.S. Application Data

(60) Provisional application No. 62/312,868, filed on Mar. 24, 2016.

(51) Int. Cl.
| | | |
|---|---|---|
| C09K 8/035 | (2006.01) | |
| C09K 8/03 | (2006.01) | |
| C09K 8/62 | (2006.01) | |
| E21B 37/06 | (2006.01) | |

(52) U.S. Cl.
CPC ........... *C09K 8/035* (2013.01); *C09K 8/03* (2013.01); *C09K 8/62* (2013.01); *E21B 37/06* (2013.01)

(58) Field of Classification Search
CPC ... C09K 8/03; C09K 8/05; C09K 8/66; C09K 8/665; C09K 8/84; C09K 8/845
See application file for complete search history.

(56) References Cited

U.S. PATENT DOCUMENTS

| | | |
|---|---|---|
| 1,911,195 A | 5/1933 | Kepfer |
| 2,191,312 A | 2/1940 | Cannon |
| 2,898,294 A | 8/1959 | Priest et al. |

(Continued)

FOREIGN PATENT DOCUMENTS

| | | |
|---|---|---|
| CN | 106928930 A | 7/2017 |
| EP | 0194254 A1 | 9/1986 |

(Continued)

OTHER PUBLICATIONS

Chen, et al.; Effect of Cryoprotectants on Eutectics of NaCl 2H2O/ice and KCl/ice Studied by Temperature Wave Analysis and Differential Scanning Calorimetry; Thermochimica Acta 431 (2005) 106-112; 7 pgs.

(Continued)

*Primary Examiner* — Aiqun Li
(74) *Attorney, Agent, or Firm* — Bracewell LLP; Constance Gall Rhebergen

(57) ABSTRACT

A method of using a suppression factor fluid during a well activity is provided. The method comprising the steps of introducing a suppression factor fluid into a wellbore, the suppression factor fluid comprising an untreated divalent brine, and a suppression sugar alcohol, the suppression sugar alcohol in an amount operable to achieve a suppression factor of at least 0.1, wherein a density upper limitation of the suppression factor fluid is greater than the density upper limitation of the divalent brine; wherein the suppression factor fluid is in the absence of zinc; and completing the well activity in the wellbore, such that the suppression sugar alcohol inhibits crystallization during the well activity.

4 Claims, 1 Drawing Sheet

(56) References Cited

U.S. PATENT DOCUMENTS

| | | | |
|---|---|---|---|
| 3,275,552 | A | 9/1966 | Kern et al. |
| 4,292,183 | A | 9/1981 | Sanders |
| 4,444,668 | A | 4/1984 | Walker et al. |
| 4,465,601 | A | 8/1984 | Pasztor, Jr. |
| 4,486,340 | A | 12/1984 | Glass, Jr. |
| 4,566,976 | A | 1/1986 | House et al. |
| 5,076,364 | A | 12/1991 | Hale et al. |
| 5,330,683 | A * | 7/1994 | Sufrin ............... C09K 5/20 252/387 |
| 5,415,230 | A | 5/1995 | Fisk, Jr. et al. |
| 5,728,652 | A | 3/1998 | Dobson, Jr. |
| 5,846,914 | A | 12/1998 | Finkelstein et al. |
| 6,080,704 | A | 6/2000 | Halliday et al. |
| 6,100,222 | A | 8/2000 | Vollmer et al. |
| 6,124,244 | A | 9/2000 | Murphey |
| 6,489,270 | B1 | 12/2002 | Vollmer et al. |
| 6,617,285 | B2 | 9/2003 | Crews |
| 6,635,604 | B1 | 10/2003 | Halliday et al. |
| 6,730,234 | B2 | 5/2004 | Symens et al. |
| 6,843,931 | B2 | 1/2005 | Sapienza |
| 7,048,961 | B2 | 5/2006 | Knauf |
| 7,078,370 | B2 | 7/2006 | Crews |
| 7,306,039 | B2 | 12/2007 | Wang et al. |
| 7,825,073 | B2 | 11/2010 | Welton et al. |
| 7,910,524 | B2 | 3/2011 | Welton et al. |
| 7,960,315 | B2 | 6/2011 | Welton et al. |
| 8,003,578 | B2 | 8/2011 | Monroe et al. |
| 8,030,254 | B2 | 10/2011 | Phatak et al. |
| 8,067,342 | B2 | 11/2011 | Lin et al. |
| 8,071,059 | B2 | 12/2011 | Filippi et al. |
| 8,381,537 | B2 | 2/2013 | Morita et al. |
| 8,697,611 | B2 | 4/2014 | Zhang et al. |
| 8,853,135 | B2 | 10/2014 | Phatak et al. |
| 8,936,111 | B2 | 1/2015 | Maghrabi et al. |
| 8,950,492 | B2 | 2/2015 | Maghrabi et al. |
| 9,593,276 | B2 | 3/2017 | Livanec |
| 9,868,890 | B2 | 1/2018 | Alleman |
| 2003/0092581 | A1* | 5/2003 | Crews ............... C09K 8/665 507/100 |
| 2004/0124013 | A1 | 7/2004 | Wiesner et al. |
| 2005/0038199 | A1 | 2/2005 | Wang et al. |
| 2005/0101491 | A1 | 5/2005 | Vollmer |
| 2005/0253110 | A1* | 11/2005 | Chauhan ........... C09K 3/185 252/70 |
| 2008/0093579 | A1 | 4/2008 | Knauf |
| 2008/0269081 | A1 | 10/2008 | Lin et al. |
| 2009/0048126 | A1 | 2/2009 | Phatak et al. |
| 2010/0016180 | A1 | 1/2010 | Scoggins et al. |
| 2010/0093565 | A1 | 4/2010 | Phatak et al. |
| 2010/0130388 | A1 | 5/2010 | Phatak et al. |
| 2010/0163255 | A1 | 7/2010 | Horton et al. |
| 2010/0303737 | A1 | 12/2010 | Hurtig |
| 2010/0311621 | A1 | 12/2010 | Kesavan et al. |
| 2012/0118569 | A1 | 5/2012 | Deville |
| 2013/0098615 | A1 | 4/2013 | Perez et al. |
| 2013/0168095 | A1 | 7/2013 | Loveless et al. |
| 2013/0231268 | A1 | 9/2013 | Ghosh et al. |
| 2014/0148366 | A1 | 5/2014 | Reyes Bautista |
| 2014/0221256 | A1 | 8/2014 | Holtsclaw et al. |
| 2014/0262283 | A1 | 9/2014 | Savari et al. |
| 2014/0352961 | A1 | 12/2014 | Dobson, Jr. et al. |
| 2015/0096808 | A1 | 4/2015 | Misino et al. |
| 2016/0177698 | A1 | 6/2016 | Schultheiss et al. |
| 2016/0208158 | A1 | 7/2016 | Monahan et al. |
| 2017/0088762 | A1 | 3/2017 | Zhang et al. |
| 2017/0145284 | A1 | 5/2017 | Davidson et al. |
| 2017/0158939 | A1 | 6/2017 | Chen et al. |
| 2017/0158976 | A1 | 6/2017 | O'Rear et al. |
| 2017/0190954 | A1 | 7/2017 | Schultheiss et al. |
| 2017/0292055 | A1 | 10/2017 | Alleman |
| 2018/0016484 | A1 | 1/2018 | Ray et al. |

FOREIGN PATENT DOCUMENTS

| | | | |
|---|---|---|---|
| EP | 2463350 | A1 | 6/2012 |
| EP | 1863890 | B1 | 10/2014 |
| GB | 2250761 | A | 6/1992 |
| GB | 2334279 | A | 8/1999 |
| JP | 56098482 | A | 8/1981 |
| KR | 20040043935 | A | 5/2004 |
| WO | 9821291 | A1 | 5/1998 |
| WO | 03064555 | A1 | 8/2003 |
| WO | 2004050557 | A1 | 6/2004 |
| WO | 2009126548 | A2 | 10/2009 |
| WO | 20015068865 | A1 | 5/2015 |
| WO | 2016025137 | A1 | 2/2016 |
| WO | 2017165754 | A1 | 9/2017 |

OTHER PUBLICATIONS

PCT/US2017/023995 International Search Report and Written Opinion dated May 24, 2017; 15 Pgs.

PCT/US2017/023996 International Search Report and Written Opinion dated May 24, 2017; 16 Pgs.

PCT/US2017/024008 International Search Report and Written Opinion dated May 24, 2017; 16 Pgs.

Telang, et al., , Effective Inhibition of Mannitol Crystallization in Frozen Solutions by Sodium Chloride, Pharmaceutical Research (Apr. 2003), vol. 20, No. 4, 660-667; 8 pgs.

U.S. Appl. No. 15/791,748 Non-Final Office Action dated Feb. 25, 2019 (21 pages).

The International Search Report and Written Opinion for related PCT application PCT/US2018/057200 dated Dec. 14, 2018, 14 pages.

The International Search Report and Written Opinion for related PCT application PCT/US2018/057202 dated Jan. 7, 2019, 15 pages.

The International Search Report and Written Opinion for related PCT application PCT/US2018/057205 dated Dec. 14, 2018, 14 pages.

Kaminski, et al., "Clearly Different", Reprinted from Oilfield Technology, Jul. 2012, 4 pgs.

Section B14 Solubility in Non-Aqueous Solvents, Formate Technical Manual, Mar. 2013, 1-4, Version 1, Cabot Specialty Fluids, 4 pgs.

\* cited by examiner

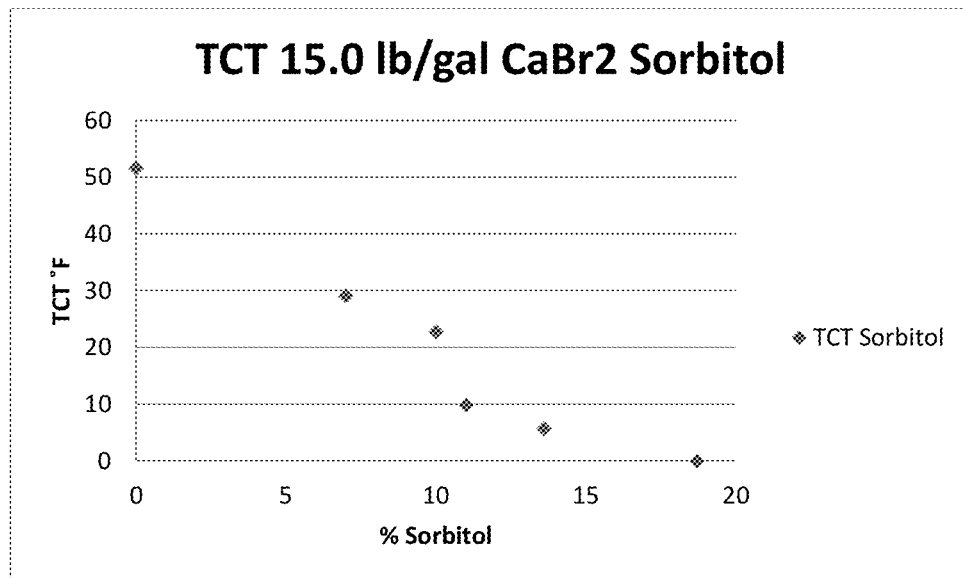

HIGH DENSITY, LOW TCT DIVALENT BRINES AND USES THEREOF

RELATED APPLICATIONS

This application claims priority from U.S. Provisional Application No. 62/312,868 filed on Mar. 24, 2016. For purposes of United States patent practice, this application incorporates the contents of the provisional application by reference in its entirety.

BACKGROUND

Technical Field

Described are compositions for use as well fluids. More specifically, described are compositions with low true crystallization temperatures and high densities for use as well fluids.

Description of the Related Art

When used as a heavy completion fluid, brines can crystallize if exposed to lower temperatures or higher pressures. As the density of a brine above its eutectic point increases so does the true crystallization temperature (TCT) and pressure crystallization temperature (PCT), which can cause blockage to tubulars in a wellbore on the surface if the fluid crystallizes. Applying pressure to a divalent brine at a density above the eutectic point will lead to an increase in density, which in turn can lead to crystallization.

Crystallization inhibitors can be used to lower the TCT and PCT, but can also result in a reduction of the density of the brine. Zinc, such as in the form of zinc bromide ($ZnBr_2$), can be added to increase the density. However, zinc is a marine pollutant and can cause issues in the processing stage if residual zinc is in the oil sent to the refinery.

In conventional brine systems, typical crystallization inhibitors, such as methanol and ethylene glycol, can lower TCT, but also dramatically lower the density of the brine (making it unsuitable for the original purpose), which means that more solid divalent salt has to be added to bring the density of the brine back to the operational density. In most cases, enough divalent salt cannot be added to achieve the operational density and the required crystallization temperature without adding weighting additives, such as zinc bromide.

SUMMARY

Described are compositions for use as well fluids. More specifically, described are compositions with low true crystallization temperatures and high densities for use as well fluids.

In a first aspect, a method of using a suppression factor fluid during a well activity is provided. The method includes the steps of introducing a suppression factor fluid into a wellbore. The suppression factor fluid includes an untreated divalent brine, and a suppression sugar alcohol. The suppression sugar alcohol is in an amount operable to achieve a suppression factor of at least 0.1, where a density upper limitation of the suppression factor fluid is greater than the density upper limitation of the divalent brine and wherein the suppression factor fluid is in the absence of zinc. The method further including the step of completing the well activity in the wellbore, such that the suppression sugar alcohol inhibits crystallization during the well activity.

In certain aspects, the untreated divalent brine is selected from the group consisting of a calcium bromide brine, a calcium chloride brine, a magnesium bromide brine, a magnesium chloride brine, a strontium bromide brine, and combinations thereof. In certain aspects, the suppression sugar alcohol is selected from the group consisting of sorbitol, xylitol, and combinations thereof. In certain aspects, the suppression factor is in the range between 0.1 and 10. In certain aspects, the suppression factor fluid further includes a polyol.

In a second aspect, a composition for use as a suppression factor fluid is provided. The composition includes an untreated divalent brine, and a suppression sugar alcohol. The suppression sugar alcohol in an amount operable to achieve a suppression factor of at least 0.1, where the suppression factor fluid has a density upper limitation that is greater than the density upper limitation of the divalent brine.

In certain aspects, the composition is in the absence of zinc.

In a third aspect, a composition for use as a suppression factor fluid is provided. The composition including 70% by weight to 99.9% by weight of an untreated divalent brine, and 0.1% by weight on a dry weight basis to 30% by weight on a dry weight basis of a suppression sugar alcohol.

In a fourth aspect, a method of creating a suppression factor fluid is provided. The method includes the steps of adding an amount of a suppression sugar alcohol to a divalent brine to create a mixture, where the amount of the suppression sugar alcohol is operable to achieve a suppression factor of between 0.1 and 10, and mixing the mixture until the suppression sugar alcohol is dissolved.

In certain aspects, the amount of the suppression sugar alcohol is between 0.1% by weight on a dry weight basis and 30% by weight on a dry weight basis. In certain aspects, the amount of the suppression sugar alcohol is added in a solid form. In certain aspects, the amount of the suppression sugar alcohol is added in an aqueous form. In certain aspects, the method further comprises adding additional divalent salt to the suppression factor fluid after the suppression sugar alcohol after the step of mixing the mixture, such that the additional divalent salt achieves an operational density of the suppression factor fluid. In certain aspects, the composition further includes the step of adding a polyol.

BRIEF DESCRIPTION OF THE DRAWINGS

These and other features, aspects, and advantages of the embodiments will become better understood with regard to the following descriptions, claims, and accompanying drawings. It is to be noted, however, that the drawings illustrate only several embodiments and are therefore not to be considered limiting of the scope as it can admit to other equally effective embodiments.

FIG. 1 is a graph showing TCT versus weight percent (wt %) suppression sugar alcohol for a suppression sugar alcohol in a 15 pound per gallon (ppg) calcium bromide brine of Example 5.

DETAILED DESCRIPTION

While the scope will be described with several embodiments, it is understood that one of ordinary skill in the relevant art will appreciate that many examples, variations and alterations to the apparatus and methods described herein are within the scope and spirit. Accordingly, the exemplary embodiments described herein are set forth without any loss of generality, and without imposing limitations.

Embodiments of a suppression factor fluid can include a divalent brine and a suppression sugar alcohol and methods of using the suppression factor fluid as a well fluid during a well activity.

As used herein, "crystallization" refers to the formation of crystals in a brine when it cools. Without being bound by a particular theory, crystallization occurs when it is thermodynamically favorable, that is it takes less energy to crystallize than to stay in solution. As an example, crystallization in a well can occur at the mud line due to the mud line temperature and the pressure exerted on the fluid.

As used herein, "well fluid" refers to a fluid that can be used in a wellbore. Well fluids encompass drilling fluids, completion fluids, packer fluids, production fluids, fracturing fluids, and the like in well activities.

As used herein, "well activity" refers to drilling activities, production activities, and completion activities. Examples of well activities include, but are not limited to, drilling, completion, and workover.

As used herein, "stable" or "stabilize" means that when a composition, component, or compound is stable, the composition, component or compound does not degrade, decompose, or precipitate from solution.

As used herein, "true crystallization temperature" or "TCT" refers to the temperature at which crystals form in a brine for a given brine density. The true crystallization temperature is defined as the temperature corresponding to the maximum temperature reached following the super-cooling minimum. In a plot of temperature during a cooling cycle, TCT is the maximum temperature reached following the super-cooling minimum or the inflection point in cases with no super-cooling. If there is no super-cooling TCT will equal first crystal to appear (FCTA). TCT is the measured crystallization temperature nearest the temperature at which a brine will naturally crystallize in pumps, lines, filtration units, and tanks. Further described in API Recommended Practice 13J, *Testing of Heavy Brines*, 5$^{th}$ Ed. October 2014. By way of example, in an untreated divalent brine containing only a divalent salt and water, as the brine density changes, the TCT changes. Table 1 provides examples of TCT and brine density for untreated brines containing only a divalent salt and water.

TABLE 1

Examples of TCT and brine density for untreated brines

| Brine | Brine Density | TCT |
|---|---|---|
| $CaBr_2$ | 14.5 ppg | 30° F. |
| $CaCl_2$ | 11.6 ppg | 44° F. |
| $MgBr_2$ | 13.2 ppg | 32° F. |
| $MgCl_2$ | 10.5 ppg | 2° F. |

As used herein, "suppression sugar alcohol" refers to a component derived from the reduction of a saccharide that is useful as a suppression additive in suppressing the true crystallization temperature. Examples of suppression sugar alcohols suitable for use include sorbitol, xylitol, and combinations thereof. In at least one embodiment, the suppression sugar alcohol includes sorbitol in combination with other sugar alcohols. In at least one embodiment, the suppression sugar alcohol includes xylitol in combination with other sugar alcohols. In at least one embodiment, the suppression sugar alcohol includes sorbitol and xylitol in combination with other sugar alcohols. Sugar alcohols do not include sugars. Advantageously, the sugar alcohols described herein are biodegradable, exhibit low toxicity, and do not bioaccumulate.

As used herein, "polyol" refers to an alcohol containing at least three hydroxyl groups that is not derived from a sugar. For purposes of this description, the term polyol does not encompass sugar alcohols. Examples of polyols include glycerol, triglycerol, polypropylene glycol triol, polyether triols, trimethylopropane, trimethylolethane, and combinations of the same.

As used herein, "suppression factor" is a measure of the reduction in TCT relative to the amount of suppression sugar alcohol. The suppression factor is determined by the following equation:

suppression factor=$[TCT_{no\ supp\ add} - TCT_{supp\ add}]/\%$ suppression additive                  equation (1)

where $TCT_{no\ supp\ add}$ is the TCT of an untreated divalent brine, $TCT_{supp\ add}$ is the TCT of a divalent brine with a suppression additive added, and % suppression additive refers to the amount of suppression additive added to the divalent brine.

As used herein, "density upper limitation" refers to the density that can be achieved in a brine fluid while avoiding crystallization at well conditions, including mud line temperature and pressure. The density is a measure of the loading of divalent salt in an aqueous fluid, measured in pounds per gallon (ppg). For a calcium bromide brine (a solution of only calcium bromide and water), the density upper limitation is about 14.2 ppg for a TCT of 11° F. For a calcium chloride brine (a solution of only calcium chloride and water), the density upper limitation is 11.3 ppg for a TCT of 13° F.

As used herein, "operational density" refers to the desired or target density of a well fluid as required for a particular well activity.

As used herein, "solubility" refers to the measure of how much of a component can be dissolved in a fluid.

As used herein, "untreated divalent brine" refers to a divalent brine in the absence of a suppression additive, where the suppression additive suppresses the TCT.

Embodiments provide a suppression factor fluid that has a lower TCT than an untreated divalent brine at a similar density. The addition of a suppression sugar alcohol to the untreated divalent brine results in minimal loss in density as compared to the untreated divalent brine. Advantageously, the addition of a suppression sugar alcohol to a divalent brine can lower the TCT of the divalent brine for a given brine density. Embodiments can provide suppression factor fluids that are zinc free with density upper limitations of 15.8 ppg and a TCT of at least 3° F. below that of an untreated divalent brine of the same density. Compositions described herein suppress the thermodynamic event that leads to crystallization and allow more divalent salts to be added to the solution, than compositions in the absence of a suppression sugar alcohol. The suppression factor fluids are stable (do not crystallize) even though the salt content in the fluid is greater than the saturation point of salt in water at any given temperature. Advantageously, the compositions described herein provide fluids with densities that expand beyond conventional fluid densities used in well activities, while suppressing TCT, addressing a need in industry.

A suppression factor fluid for use in a well activity is provided. The composition of the suppression factor fluid includes an untreated divalent brine and a suppression sugar alcohol. In at least one embodiment, the suppression factor fluid further includes a polyol. In at least one embodiment, the suppression factor fluid includes polyol present in an amount between 0% by weight on a dry weight basis and 20% by weight on a dry weight basis, alternately between 0% by weight on a dry weight basis and 15% by weight on a dry weight basis, alternately between 0% by weight on a dry weight basis and 10% by weight on a dry weight basis, alternately between 0% by weight on a dry weight basis and 7% by weight on a dry weight basis, and alternately between 5% by weight on a dry weight basis and 7% by weight on a dry weight basis. In at least one embodiment, the polyol is glycerol.

The untreated divalent brine can be any aqueous solution containing at least one divalent salt having a density upper limitation suitable for use in the well activity. The untreated divalent brine can be selected based on the well activity to be performed, the wellbore conditions, the operational density, and the density upper limitation. Examples of untreated divalent brines include calcium bromide brine ($CaBr_2$ brine), calcium chloride brine ($CaCl_2$ brine), magnesium bromide brine ($MgBr_2$), magnesium chloride brine ($MgCl_2$ brine), strontium bromide brine ($SrBr_2$ brine) and combinations thereof. The untreated divalent brine has a true crystallization temperature related to the density upper limitation.

The suppression sugar alcohol is added in amount operable to achieve a suppression factor of at least 0.1, alternately between 0.1 and 10, alternately between 1 and 5, alternately between 1 and 4, alternately between 1 and 3, alternately between 2 and 3, and alternately between 5 and 10. In at least one embodiment, the suppression sugar alcohol is added in an amount operable to achieve a TCT suppression of at least 3° F. As used herein, "suppression" means reduction, in other words, a TCT suppression is a reduction of the TCT. In at least one embodiment, the suppression sugar alcohol is added to the divalent brine in a solid form. The solid form of a suppression sugar alcohol is free flowing and permits for easier handling, does not require storage tanks and pumps and can be accommodated at locations, including remote locations, with space restrictions. In at least one embodiment, the suppression sugar alcohol is added to the divalent brine in an aqueous form calculated on dry weight basis. The amount of suppression sugar alcohol added can be between 0.1 percent (%) by weight on a dry weight basis and 30% by weight on a dry weight basis, alternately between 0.5 wt % by weight on a dry weight basis and 25% by weight on a dry weight basis, alternately between 1% by weight on a dry weight basis and 20% by weight on a dry weight basis, alternately greater than 5% by weight on a dry weight basis, alternately greater than 10% by weight on a dry weight basis, alternately between 10% by weight on a dry weight basis and 15% by weight on a dry weight basis, alternately between 15% by weight on a dry weight basis and 20% by weight on a dry weight basis, and alternately less than 20% by weight on a dry weight basis.

The suppression factor fluid has a density upper limitation. The density upper limitation can be between 15.1 ppg and 15.8 ppg. In at least one embodiment, the density upper limitation of the suppression factor fluid is greater than 14.2 ppg.

The true crystallization temperature of the suppression factor fluid for a given density upper limitation is lower than the true crystallization temperature of the divalent brine at the same density upper limitation. The true crystallization temperature of the suppression factor fluid can be between −40° F. and 70° F.

In at least one embodiment, the suppression factor fluid is in the absence of added zinc in any form, including, but not limited to, elemental zinc, zinc salts, zinc compounds, or combinations thereof. As used herein, "added zinc" refers to zinc added to the suppression factor fluid and is not meant to include trace levels of zinc that can be present in the components. In at least one embodiment, the suppression sugar alcohol and the suppression factor fluid are in the absence of glycols, including, for example, ethylene glycol and propylene glycol.

The suppression factor fluid is created by adding an amount of a suppression sugar alcohol to an untreated divalent brine to create a mixture. The amount of the suppression sugar alcohol is operable to achieve a suppression factor of between 0.1 and 10, and alternately of up to 10. The mixture can be mixed until the suppression sugar alcohol is dissolved. As used herein, "mixed" or "mix" includes any form of combining a liquid and a solid, such as stirring, shaking, agitating, blending, and any equipment capable of creating a mixed fluid can be used. In at least one embodiment, the density of the divalent brine is higher than the operational density of the suppression factor fluid, such that when the suppression sugar alcohol is added the density of the suppression factor fluid is reduced to the operational density. In at least one embodiment, additional divalent salt can be added to the suppression factor fluid after the suppression sugar alcohol is added to increase or regain the desired density.

Embodiments provide suppression factor fluids having densities on the salt side of a solubility curve, that is densities above the eutectic point. On the salt side of a solubility curve, as density increases (i.e., more salt is added) so does the TCT. In contrast, on the ice side of a solubility curve, below the eutectic point, as density increases, the TCT goes down.

In at least one embodiment, the suppression factor fluid includes a calcium bromide brine where the suppression sugar alcohol is sorbitol. The density of sorbitol is about 12.42 ppg. The solubility of sorbitol in $CaBr_2$ can be about 19%. At 19% loading, cooling the suppression factor fluid to 4° F. does not result in crystal formation. In this range, the fluids pour point is reached before any crystals are seen. In at least one embodiment, increasing amounts of sorbitol continued to decrease the TCT. In at least one embodiment, the suppression factor fluid includes a calcium bromide brine and sorbitol as the suppression sugar alcohol and has a density upper limitation of 15.8 ppg.

A method of using a suppression factor fluid during a well activity is provided. The suppression factor fluid is introduced into a wellbore. The well activity is completed, such that during the well activity, the suppression sugar alcohol inhibits crystallization.

In at least one embodiment, the suppression factor fluid can include additives used in well fluids. In at least one embodiment, an additive that can be added to the suppression factor fluid includes a stabilization compound to inhibit degradation of the suppression sugar alcohol at bottom hole temperatures, where the stabilization compound is effective to inhibit degradation at bottom hole temperatures greater than 250° F. Examples of stabilization compounds suitable for use include, amine bases, such as monoethanolamine (MEA), diethanolamine (DEA), triethanolamine (TEA), ethylenediamine (EDA), diethylenetriamine (DETA), triethylenetetramine (TETA), tetraethylenepentamine (TEPA), pentaethylenetetramine (PETA), pentaethylenehexamine (PEHA), aminoethylpiperazine (AEP), ethyleneamine E-100 (available from Huntsman Corporation), piperazine, diethylhydroxylamine (DEHA), diethylaminoethanol (DEAE), dimethylethanolamine (DMEA), methoxypropylamine (MOPA), morpholine, n-aminopropylmorpholine (APM), 4-[2-hydroxyethyl]morpholine, diglycolamine, N-[3-aminopropyl]diethanolamine, aminoethylethanolamine (AEEA), and combinations thereof.

EXAMPLES

Example 1

Example 1 shows the effect of various polyol additives in the suppression of the TCT of calcium bromide brines. Each calcium bromide brine was formulated to have a density of 14.4 lb/gal with various amounts of polyol additives present, as shown in Table 2. The TCT of each brine was measured and a suppression factor was calculated according to equation 1.

TABLE 2

Suppression Factors for various polyol additives in calcium bromide brine

| | Polyol Additive | Density (lb/gal) | TCT (° F.) | Additive (% by weight) | Suppression Factor |
|---|---|---|---|---|---|
| Sample 1 | None | 14.5 | 18 | 0 | None |
| Sample 2 | Ethylene Glycol | 14.51 | 13.7 | 9.4 | 0.42 |
| Sample 3 | Propylene Glycol | 14.47 | 28.9 | 10 | Negative |
| Sample 4 | Sorbitol | 14.5 | −17 | 7 | 5 |
| Sample 5 | Xylitol | 14.5 | <−35 | 14.2 | 3.7 |

As shown in Table 2, the sugar alcohols have a larger suppression factor compared to the other polyol additives.

Example 2

Example 2 compared the use of different sugar alcohols as suppression additives in a calcium bromide brine. The density and TCT for each sample was measured. The composition along with density, TCT, and suppression factor of each sample can be seen in Table 3

TABLE 3

Suppress factors of various sugar alcohols in calcium bromide brine.

| | Suppression Additive | Amount of Suppression Additive (% by weight) | Density (ppg) | TCT (° F.) | Suppression Factor |
|---|---|---|---|---|---|
| Sample 1 | None | 0 | 15.3 | 73 | 0 |
| Sample 2 | Sorbitol | 14 | 15.3 | 4.7 | 4.87 |
| Sample 3 | Xylitol | 14 | 15.31 | 35.3 | 2.7 |
| Sample 4 | Mannitol | 14 | 15.29 | >75 | 0 |
| Sample 5 | Erythritol | 14 | 15.3 | >75 | 0 |

In Sample 4, after standing for a couple of weeks, crystals were discovered lining the walls of the sample container. In Sample 5, the divalent salt did not stay in solution, but precipitated out during mixing. The results of Example 2 unexpectedly show that not all sugar alcohols can be used as a suppression sugar alcohol as described herein.

Example 3

In Example 3, a sample of a suppression factor fluid was created. To 400 g of a stock $CaBr_2$ solution, 15 g of water and 91 g of sorbitol were added and the sample was mixed until the sorbitol dissolved. After the sorbitol dissolved, 159 g of solid $CaBr_2$ was added to the sample and the sample was again mixed. After the exotherm from adding the solid $CaBr_2$ subsided and all of the $CaBr_2$ dissolved in the sample, the sample was allowed to cool to room temperature. The density, viscosity and TCT of the suppression factor fluid were measured. The final density was 15.51 ppg (at 60° F.), the viscosity was 234 cP, and the TCT was 21° F. The suppression factor was 4.3.

TABLE 4

Composition of Suppression Factor Fluid of Example 3

| Component | Weight (g) | Wt % |
|---|---|---|
| Divalent Brine - 14.2 ppg Stock $CaBr_2$ | 400 | 60.1 |
| Water | 15 | 2.3 |
| Suppression Sugar Alcohol - Sorbitol | 91 | 13.7 |
| Added Solid $CaBr_2$ | 159 | 23.9 |

Example 4

Example 4 shows the impact of the addition of various suppression sugar alcohols on lowering the TCT and corresponding suppression factors. The untreated divalent brine for each sample was $CaBr_2$. The density of each sample was a 15.3 ppg.

TABLE 5

Compositions of 15.3 ppg Samples 1-5 of Example 4.

| | Suppression Sugar Alcohol | Amount of Suppression Sugar Alcohol (% by weight) | TCT (° F.) | Suppression Factor |
|---|---|---|---|---|
| Sample 1 | None | 0 | 73 | 0 |
| Sample 2 | Xylitol | 8 | 52.5 | 2.56 |
| Sample 3 | Xylitol | 12 | 37.2 | 2.98 |
| Sample 4 | Xylitol | 14 | 35.3 | 2.69 |
| Sample 5 | Sorbitol | 14 | 4.7 | 4.89 |

As shown by sample 1, the TCT of a 15.3 ppg $CaBr_2$ untreated divalent brine is about 73° F. The addition of sorbitol, as shown in Sample 5, had the greatest suppression factor relative to the other suppression sugar alcohols tested in Example 4.

Example 5

Example 5 compared the TCT of 15 ppg suppression factor fluids with sorbitol at various concentrations as the suppression sugar alcohol and calcium bromide brine as the divalent brine. Sorbitol was added to the calcium bromide brine and mixed. Then, the TCT was measured. The results are in Table 6.

TABLE 6

Compositions of 15 ppg Samples 1-5 in Example 5.

| | Amount of Sorbitol (% by weight) | TCT (° F.) | Suppression Factor |
|---|---|---|---|
| Sample 1 | 0 | 51 | 0 |
| Sample 2 | 7 | 29 | 3.14 |
| Sample 3 | 10 | 22.8 | 2.82 |

TABLE 6-continued

Compositions of 15 ppg Samples 1-5 in Example 5.

|  | Amount of Sorbitol (% by weight) | TCT (° F.) | Suppression Factor |
|---|---|---|---|
| Sample 4 | 11 | 9.8 | 3.75 |
| Sample 5 | 13 | 5.7 | 3.48 |
| Sample 6 | 18 | 0 | 2.83 |

Table 6 shows that sorbitol between 7 wt % and 13 wt % gave suppression factors between 2.82 and 3.75, respectively. As shown in FIG. 1, keeping the density constant while replacing some of the water with a sugar alcohol lowers the TCT of the brine. The suppression factor of Example 5 is between 2.5 to 4° F. per wt % of sugar alcohol added.

Example 6

Example 6 compared the TCT of 15.4 ppg suppression factor fluids. The divalent brine was a $CaBr_2$ brine. Sample 1 was a comparative sample that did not include a suppression additive. Samples 3, 4, 5, and 6 tested the suppression sugar alcohols of sorbitol, xylitol, and combinations thereof. Samples 2, 7, and 8 tested the suppression sugar alcohols of sorbitol and xylitol in combination with the polyol glycerol. The composition of each sample can be found in Table 7.

TABLE 7

Compositions of 15.4 ppg Samples 1-8 of Example 6.

|  | Amount of Glycerol (% by weight) | Amount of Sorbitol (% by weight) | Amount of Xylitol (% by weight) | TCT (° F.) | Suppression Factor |
|---|---|---|---|---|---|
| Sample 1 | 0 | 0 | 0 | 76 | 0 |
| Sample 2 | 7 | 7 | 0 | 35.2 | 2.91 |
| Sample 3 | 0 | 13 | 0 | 31.6 | 3.41 |
| Sample 4 | 0 | 14 | 0 | 24.3 | 3.69 |
| Sample 5 | 0 | 15 | 0 | 18.4 | 3.84 |
| Sample 6 | 0 | 0 | 15 | 33.4 | 2.84 |
| Sample 7 | 5 | 15 | 0 | <5 | >3.8 |
| Sample 8 | 5 | 0 | 15 | 24 | 2.6 |

Table 7 shows the impact of suppression sugar alcohols on TCT suppression over a range of concentrations.

Example 7

Examples shows that sugar alcohols can work at low loadings which reduces cost and minimizes density losses. To determine the effect of low loading of the suppression sugar alcohol on the TCT of a suppression factor fluid, a $CaBr_2$ brine, 14.5 lb/gal calcium bromide brine, was formulated with 2% by weight sorbitol as the suppression sugar alcohol. The TCT of this suppression factor fluid was determined to be 5.9° F., a suppression factor of almost 6 as shown in Table 8.

TABLE 8

Suppression factor of fluids of Example 7

|  | Additive | Density (lb/gal) | Additive (wt %) | TCT (° F.) | Suppression Factor |
|---|---|---|---|---|---|
| Sample 1 | Sorbitol | 14.5 | 2.0 | 5.9 | 6.1 |
| Sample 2 | None | 14.5 | 0.0 | 30 | 0 |

Example 8

Example shows the effect of sorbitol on the TCT of a calcium chloride brine. An 11.6 lb/gal $CaCl_2$ brine with 10% by weight sorbitol had a TCT of 1° F. compared to a $CaCl_2$ brine in the absence of a suppression sugar alcohol with a TCT of 43° F. The TCT suppression factor was determined to be 4.2 with the compositions as shown in Table 9.

TABLE 9

Suppression factor of fluids of Example 8

|  | Sorbitol (wt %) | TCT (° F.) | Suppression Factor |
|---|---|---|---|
| Sample 1 | 0 | 43 | 0 |
| Sample 2 | 10 | 1 | 4.2 |

Example 9

Example 9 shows that sorbitol also suppresses the TCT divalent brines made from a combination of salts. A divalent brine was produced from a combination of calcium bromide and calcium chloride, the composition of which is shown in Table 10.

TABLE 10

Effect of sorbitol on TCT of a calcium bromide/calcium chloride blend brine

|  | Density (lb/gal) | Sorbitol (wt %) | $CaBr_2$ (wt %) | $CaCl_2$ (wt %) | TCT (° F.) |
|---|---|---|---|---|---|
| Sample | 14.65 ppg | 12.2 | 47.1 | 4.2 | −29 |

Example 10

Example 10 shows that sorbitol, as the suppression sugar alcohol will depress the TCT of divalent brines composed of magnesium bromide and magnesium chloride. The compositions of the samples are shown in Table 11.

TABLE 11

Effect of sorbitol on TCT of $MgBr_2$ and $MgCl_2$ brines

|  | Salt | Density (lb/gal) | Sorbitol (wt %) | TCT (° F.) | Suppression Factor |
|---|---|---|---|---|---|
| Sample 1 | $MgBr_2$ | 13.6 | 0 | 15.3 | 0 |
| Sample 2 | $MgBr_2$ | 13.6 | 7.5 | 5.6 | 1.3 |
| Sample 3 | $MgCl_2$ | 10.7 | 0 | 3.5 | 0 |
| Sample 4 | $MgCl_2$ | 10.7 | 8.5 | −18 | 2.5 |

Example 11

Example 11 shows that sorbitol is effective in lower the TCT of a strontium bromide brine as compared to a strontium bromide brine in the absence of sorbitol. The compositions of the samples are shown in Table 12.

TABLE 12

Effect of sorbitol on TCT of a $SrBr_2$ brine

| | Density (lb/gal) | Suppression Sugar Alcohol | TCT (° F.) | Suppression Factor |
|---|---|---|---|---|
| Sample 1 | 13.7 | None | 37 | 0 |
| Sample 2 | 13.7 | 10 wt % sorbitol | 7.4 | 3.0 |

Although the present embodiments have been described in detail, it should be understood that various changes, substitutions, and alterations can be made hereupon without departing from the principle and scope. Accordingly, the scope should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the embodiments.

What is claimed is:

1. A composition for use as a suppression factor fluid, the composition comprising:
   an untreated divalent brine;
   greater than 5% by weight on a dry weight basis of a suppression sugar alcohol, the suppression sugar alcohol in an amount operable to achieve a suppression factor of at least 1, wherein the suppression sugar alcohol is selected from the group consisting of sorbitol, xylitol, and combinations thereof; and,
   a stabilization compound comprising an amine base, the stabilization compound operable to inhibit degradation of the suppression sugar alcohol,
   wherein the suppression factor fluid has a density upper limitation that is greater than the density upper limitation of the untreated divalent brine,
   wherein a density of the suppression factor fluid is on the salt side of a solubility curve of the untreated divalent brine, wherein the suppression factor fluid is thermally stable.

2. The composition of claim 1, wherein the untreated divalent brine is selected from the group consisting of calcium bromide brine, calcium chloride brine, magnesium bromide brine, magnesium chloride brine, a strontium bromide brine and combinations thereof.

3. The composition of claim 1, wherein the composition is in the absence of zinc.

4. The composition of claim 1 further comprising a polyol, wherein the polyol is selected from the group consisting of glycerol, triglycerol, polypropylene glycol triol, polyether triols, trimethylopropane, trimethylolethane, combinations of the same.

* * * * *